US010980257B2

(12) United States Patent
Langan et al.

(10) Patent No.: US 10,980,257 B2
(45) Date of Patent: Apr. 20, 2021

(54) METHODS FOR LOWERING GLUTEN CONTENT USING FUNGAL CULTURES

(71) Applicant: MYCOTECHNOLOGY, INC., Aurora, CO (US)

(72) Inventors: James Patrick Langan, Denver, CO (US); Brooks John Kelly, Denver, CO (US); Huntington Davis, Broomfield, CO (US); Alan D. Hahn, Lake Forest, CA (US)

(73) Assignee: Myco Technology, Inc., Aurora, CO (US)

( * ) Notice: Subject to any disclaimer, the term of this patent is extended or adjusted under 35 U.S.C. 154(b) by 0 days.

(21) Appl. No.: 15/551,894

(22) PCT Filed: Feb. 26, 2016

(86) PCT No.: PCT/US2016/019929
§ 371 (c)(1),
(2) Date: Aug. 17, 2017

(87) PCT Pub. No.: WO2016/138476
PCT Pub. Date: Sep. 1, 2016

(65) Prior Publication Data
US 2018/0064148 A1 Mar. 8, 2018

Related U.S. Application Data

(60) Provisional application No. 62/121,483, filed on Feb. 26, 2015.

(51) Int. Cl.
A23L 7/104 (2016.01)
A23J 3/34 (2006.01)
A23L 7/10 (2016.01)

(52) U.S. Cl.
CPC .............. *A23L 7/104* (2016.08); *A23J 3/346* (2013.01); *A23L 7/197* (2016.08)

(58) Field of Classification Search
CPC ............ A23L 7/104; A23L 7/197; A23J 3/346
See application file for complete search history.

(56) References Cited

U.S. PATENT DOCUMENTS

| | | | |
|---|---|---|---|
| 1,822,227 A | 9/1931 | Lendrich et al. | |
| 2,451,567 A | 10/1948 | Elmer et al. | |
| 2,693,664 A | 8/1949 | Szuecs | |
| 2,505,811 A | 5/1950 | Szuecs | |
| 2,693,665 A | 11/1954 | Harry | |
| 2,761,246 A | 9/1956 | Szuecs | |
| 2,928,210 A | 3/1960 | Cirillo et al. | |
| 3,086,320 A | 4/1963 | Burdet | |
| 3,701,714 A | 10/1972 | Okada et al. | |
| 3,749,584 A | 7/1973 | Kurtzman et al. | |
| 3,810,997 A | 5/1974 | Chien | |
| 4,071,973 A | 2/1978 | Iizuka et al. | |
| 4,590,160 A | 5/1986 | Nishihashi et al. | |
| 4,891,220 A | 1/1990 | Byron | |
| 5,312,630 A * | 5/1994 | Pfaff | A23L 11/09 426/231 |
| 5,934,012 A | 8/1999 | Holtz et al. | |
| 6,045,834 A | 4/2000 | Howes et al. | |
| 6,277,396 B1 | 8/2001 | Dente | |
| 6,476,003 B1 | 11/2002 | Jordan et al. | |
| 6,490,824 B1 | 12/2002 | Intabon et al. | |
| 6,558,943 B1 | 5/2003 | Li | |
| 6,569,475 B2 | 5/2003 | Song | |
| 8,133,527 B2 * | 3/2012 | Haynes | A21D 13/02 426/622 |
| 8,486,675 B2 | 7/2013 | Tang | |
| 8,529,981 B2 | 9/2013 | Tang | |
| 8,535,907 B2 | 9/2013 | Tang | |
| 8,623,445 B2 | 1/2014 | Tang | |
| 8,685,475 B2 | 4/2014 | Kwack et al. | |
| 8,821,955 B2 | 9/2014 | Tang | |
| 9,034,402 B2 | 5/2015 | Wong | |

(Continued)

FOREIGN PATENT DOCUMENTS

| | | |
|---|---|---|
| CN | 102860541 A | 1/2013 |
| DE | 4341316 A1 | 6/1995 |

(Continued)

OTHER PUBLICATIONS

Schindler et al. (2012) "Improvement of the Aroma of Pea (*Pisum sativum*) Protein Extracts by Lactic Acid Fermentation," Food Biotechnol. 26(1):58-74.
U.S. Appl. No. 13/844,685 /2014-0302560 / U.S. Pat. No. 9,068,17, filed Mar. 15, 2013 /Oct. 9, 2014 / Jun 30, 2015, Brooks John Kelly.
U.S. Appl. No. 13/859,719 / 2014-0065263 / U.S. Pat. No. 9,427,008, filed Apr. 9, 2013 / Mar. 6, 2014 / Aug. 30, 2016, Brooks John Kelly.
U.S. Appl. No. 13/874,832 / 2014-0065131, filed May 1, 2013 / Mar. 6, 2014, Brooks John Kelly.
U.S. Appl. No. 14/020,512 / 2014-0170264, filed Sep. 6, 2013 / Jun. 9, 2014, Brooks John Kelly.
U.S. Appl. No. 14/659,057 / 2015-0257405, filed Mar. 16, 2015 / Sep. 17, 2015, Brooks John Kelly.

(Continued)

*Primary Examiner* — Felicia C Turner
(74) *Attorney, Agent, or Firm* — Leydig, Voit & Mayer, Ltd.

(57) ABSTRACT

The present invention provides a method for the preparation of a gluten-containing grain having lowered levels of gluten. The method includes providing a prepared gluten-containing grain which may be optionally sterilized or pasteurized. The prepared gluten-containing grain is then inoculated with a prepared fungal component and incubated. In one embodiment the prepared fungal component myceliates the prepared gluten-containing grain while incubated and during this process hydrolyzes gluten in the prepared gluten-containing grain. The present invention also includes a gluten-containing grain having lowered levels of gluten which has been prepared by the methods of the invention.

11 Claims, No Drawings

(56) References Cited

U.S. PATENT DOCUMENTS

| | | |
|---|---|---|
| 9,068,171 B2 | 6/2015 | Kelly et al. |
| 9,427,008 B2 | 8/2016 | Kelly et al. |
| 9,480,274 B2 | 11/2016 | Tang |
| 9,572,363 B2 | 2/2017 | Langan et al. |
| 9,572,364 B2 | 2/2017 | Langan et al. |
| 10,010,103 B2 | 7/2018 | Soni et al. |
| 10,231,469 B2 | 3/2019 | Kelly et al. |
| 2002/0082418 A1 | 6/2002 | Ikewaki et al. |
| 2002/0137155 A1 | 9/2002 | Wasser et al. |
| 2003/0208796 A1 | 11/2003 | Song et al. |
| 2004/0009143 A1 | 1/2004 | Golz-Berner et al. |
| 2004/0035047 A1 | 2/2004 | Hwang et al. |
| 2004/0211721 A1 | 10/2004 | Stamets |
| 2005/0180989 A1 | 8/2005 | Matsunaga |
| 2005/0255126 A1 | 11/2005 | Tsubaki et al. |
| 2005/0273875 A1 | 12/2005 | Elias |
| 2006/0014267 A1 | 1/2006 | Cleaver et al. |
| 2006/0134294 A1 | 6/2006 | McKee et al. |
| 2006/0280753 A1 | 12/2006 | McNeary |
| 2007/0160726 A1 | 7/2007 | Fujii |
| 2008/0031892 A1 | 2/2008 | Kristiansen |
| 2008/0057162 A1 | 3/2008 | Brucker et al. |
| 2008/0107783 A1 | 5/2008 | Anijis et al. |
| 2008/0171104 A1 | 7/2008 | Zhu |
| 2008/0193595 A1 | 8/2008 | De Vuyst et al. |
| 2008/0264858 A1 | 10/2008 | Stamets |
| 2008/0274234 A1 | 11/2008 | Miller |
| 2008/0296223 A1 | 12/2008 | Hiromoto |
| 2008/0299645 A1 | 12/2008 | Holliday |
| 2009/0047236 A1 | 2/2009 | Stamets |
| 2009/0047237 A1 | 2/2009 | Stamets |
| 2009/0053363 A1 | 2/2009 | An |
| 2009/0098244 A1 | 4/2009 | Schatzmayr et al. |
| 2009/0104310 A1 | 4/2009 | Nakajima |
| 2009/0130138 A1 | 5/2009 | Stamets |
| 2009/0220645 A1 | 9/2009 | Martinez |
| 2009/0280212 A1 | 11/2009 | Sugimoto et al. |
| 2010/0055241 A1 | 3/2010 | Nakano et al. |
| 2010/0183765 A1 | 7/2010 | Laan Van Der et al. |
| 2010/0203189 A1 | 8/2010 | Holliday |
| 2010/0203210 A1 | 8/2010 | Salminen et al. |
| 2010/0221385 A1 | 9/2010 | Matsui et al. |
| 2010/0239711 A1 | 9/2010 | Li |
| 2010/0266726 A1 | 10/2010 | Ogura et al. |
| 2010/0316763 A1 | 12/2010 | Choi et al. |
| 2011/0008384 A1 | 1/2011 | Stamets |
| 2011/0052758 A1 | 3/2011 | Greiner-Stoeffele |
| 2011/0070332 A1 | 3/2011 | Bernaert et al. |
| 2011/0081448 A1 | 4/2011 | Dunphy et al. |
| 2011/0091579 A1 | 4/2011 | Hausma |
| 2011/0123675 A1 | 5/2011 | Bernaert et al. |
| 2011/0189220 A1 | 8/2011 | Yang |
| 2011/0200551 A1 | 8/2011 | Stamets |
| 2011/0206721 A1 | 8/2011 | Nair |
| 2011/0229616 A1 | 9/2011 | Anijis et al. |
| 2011/0250339 A1 | 10/2011 | Onishi et al. |
| 2011/0262593 A1 | 10/2011 | Binggeli et al. |
| 2011/0268980 A1 | 11/2011 | Kalisz et al. |
| 2012/0027829 A1 | 2/2012 | Portella |
| 2012/0028345 A1 | 2/2012 | Ibrahim et al. |
| 2012/0034339 A1 | 2/2012 | Giuliani et al. |
| 2012/0034344 A1 | 2/2012 | Menon et al. |
| 2012/0082754 A1 | 4/2012 | Holliday |
| 2012/0100249 A1 | 4/2012 | Laan et al. |
| 2012/0128823 A1 | 5/2012 | Camu |
| 2012/0171308 A1 | 7/2012 | Da Luz Moreira et al. |
| 2012/0177781 A1 | 7/2012 | Hayashi |
| 2012/0190093 A1 | 7/2012 | Fukuda |
| 2012/0231114 A1 | 9/2012 | Bezerrz De Oliveira et al. |
| 2012/0244254 A1 | 9/2012 | Takahashi |
| 2012/0321744 A1 | 12/2012 | Chhun et al. |
| 2013/0209608 A1 | 8/2013 | Berends et al. |
| 2013/0209609 A1 | 8/2013 | Moreno et al. |
| 2013/0337114 A1 | 12/2013 | Binggeli et al. |
| 2014/0065131 A1 | 3/2014 | Kelly et al. |
| 2014/0065263 A1 | 3/2014 | Kelly et al. |
| 2014/0105928 A1 | 4/2014 | Stamets |
| 2014/0170264 A1 | 6/2014 | Kelly et al. |
| 2014/0302560 A1 | 10/2014 | Kelly |
| 2015/0257405 A1 | 9/2015 | Kelly et al. |
| 2015/0257406 A1 | 9/2015 | Kelly et al. |
| 2015/0272155 A1 | 10/2015 | Kelly et al. |
| 2016/0058049 A1 | 3/2016 | Langan et al. |
| 2016/0120201 A9 | 5/2016 | Kelly et al. |
| 2016/0249660 A1 | 9/2016 | Langan et al. |
| 2017/0156383 A1 | 6/2017 | Langan et al. |
| 2018/0064148 A1 | 3/2018 | Langan et al. |
| 2018/0303044 A1 | 10/2018 | Soni et al. |
| 2019/0254305 A1 | 8/2019 | Kelly |
| 2019/0364921 A1 | 12/2019 | Kelly et al. |

FOREIGN PATENT DOCUMENTS

| | | |
|---|---|---|
| EP | 1 173 544 A1 | 1/2002 |
| EP | 0 946 106 B1 | 5/2002 |
| EP | 1 428 440 A1 | 6/2004 |
| EP | 1 695 631 A1 | 8/2006 |
| EP | 2 474 221 A1 | 2/2011 |
| EP | 1 534 088 B1 | 9/2011 |
| EP | 2 591 683 A2 | 5/2013 |
| EP | 2 166 879 B1 | 10/2014 |
| GB | 2059243 A | 4/1981 |
| JP | S50-037742 A | 12/1975 |
| JP | S59-135840 A | 4/1984 |
| JP | S61-219340 A | 8/1986 |
| JP | S62-091161 A | 4/1987 |
| JP | H04-126037 A | 4/1992 |
| JP | H11-346657 A | 12/1999 |
| JP | 2005-027540 A | 2/2005 |
| JP | 2011-103901 A | 6/2011 |
| KR | 10-1487724 B1 | 2/2015 |
| NL | 7322 C | 4/1921 |
| WO | 2001/032830 A2 | 5/2001 |
| WO | 2006/107208 A2 | 10/2006 |
| WO | 2007/031186 A1 | 3/2007 |
| WO | 2010/038867 A1 | 4/2010 |
| WO | 2011/012680 A2 | 2/2011 |
| WO | 2011/032244 A1 | 3/2011 |
| WO | 2011/151831 A1 | 12/2011 |
| WO | 2013/171194 A1 | 11/2013 |
| WO | 2014/055035 A1 | 4/2014 |
| WO | 2014/145256 A1 | 9/2014 |
| WO | 2014/145265 A2 | 9/2014 |
| WO | 2016/033241 A1 | 3/2016 |
| WO | 2016/138476 A1 | 9/2016 |

OTHER PUBLICATIONS

U.S. Appl. No. 14/659,595 / 2015-0257406, filed Mar. 16, 2015 / Sep. 17, 2015, Brooks John Kelly.

U.S. Appl. No. 14/734,943 / 2015-0272155, filed Jun. 9, 2015 / Oct. 1, 2015, Brooks John Kelly.

U.S. Appl. No. 14/836,830 / 2016-0058049 / U.S. Pat. No. 9,572,363, filed Aug. 26, 2015/ Mar. 3, 2016 / Feb. 21, 2017, James Patrick Langan.

U.S. Appl. No. 15/144,164 / 2016-0249660 / U.S. Pat. No. 9,572,364, filed May 2, 2016 /Sep. 1, 2016 / Feb. 21, 2017, James Patrick Langan.

U.S. Appl. No. 15/438,576 / 2017-0156383, filed Feb. 21, 2017 / Jun. 8, 2017, James Patrick Langan.

U.S. Appl. No. 15/488,183, filed Apr. 14, 2017, Bhupendra Kumar Soni.

Ali et al. (2010) "Production of pyrazine flavours by mycelial fungi," Master's thesis, University of Pretoria.

Berovic et al. (2003) "Submerged cultivation of Ganoderma lucidum biomass and immunostimulatory effects of fungal polysaccharides," J. Biotechnol. 103(1):77-86.

Beuchat (2001) "13 Indigenous Fermented Foods," In; Biotechnology. 2nd Ed. Eds: Rehm et al. Wiley-VCH Verlag GmbH. Weinheim, Germany. pp. 505-559.

Bok et al. (1999) "Antitumor sterols from the mycelia of Cordyceps sinensis," Phytochemistry. 51:891-898.

(56) References Cited

OTHER PUBLICATIONS

Buffo et al. (2004) "Coffee flavour: an overview," Flavour and Fragrance Journal. 19:99-104.
Chang et al. (2002) "Bioactive Polysaccharides from Traditional Chinese Medicine Herbs as Anticancer Adjuvants," The Journal of Alternative and Complementary Medicine. 8(5):559-565.
Chang et al. (2009) "Ganoderma lucidum Extract Promotes Immune Responses in Normal BALB/c Mice In Vivo," In Vivo. 23:755-760.
Crafack et al. (2013) "Influencing cocoa flavour using Pichia Kluyveri and Kluyveromyces marxianus in a defined mixed starter culture for cocoa fermentation," International Journal of Food Microbiology. 167:103-116.
De Melo et al. (2008) "Influence of Flammulina velutipes mycelia culture conditions on antimicrobial metabolite production," Mycoscience. 50(11:78-81.
Diekman (Sep. 2012) "Sweeterners Facts and Fallacies: Learn the Truth about the Different Types of Sweeterners to Better Counsel Patients," Today's Dietitian. 14(9):42-45.
Emden (2015) "Decaffeination 101: Four Ways to Decaffeinate Coffee" Coffee Connection; retrieved from: http://www.coffeeconfidential.org/health/decaffeination/ Jan. 29, 2015. 7 pages.
Encyclopedia Britannica, Louis Pasteur, Datasheet [online]. Copyright 2014 Encyclopedia Britannica Inc. [retrieved on Feb. 6, 2014]. Retrieved from the Internet: <URL: http://www.britannica.com/Ebchecked/topic/445964/Louis-Pasteur>. Specif, p. 3.
Fan et al. (2000) "Use of various coffee industry residues for the cultivation of Pleurotus ostreatus in solid state rermentation," Acta Biotechnol. 20(1):41-52.
Firenzuoli et al. (2008) "The Medicinal Mushroom *Agaricus blazei* Murrill: Review of Literature and Pharmaco-Toxicological Problems," Evid. Based Complement Alternat. Med. 5(1):3-15.
Foster (2014) "What is Mycelium?" wisegeek.com. Conjecture Corporation.
Hadar et al. (1986) "Chemical Composition of the Edible Mushroom *Pleurotus ostreatus* Produced by Fermentation," Appl. Environ. Microbiol. 51:1352-1354.
Han (2005) "Solid-state fermentation of cornmeal with the basidiomycete Ganoderma lucidum for degrading starch and upgrading nutritional value," J. Appl. Micro. 99:910-915.
Hashim (1997) "Effect of Processing on Flavour Precursors, Pyrazines and Flavour Quality of Malaysian Cocoa Beans," PhD thesis, Universiti Pertanian Malaysia.
He et al. (2010) "Patented Techniques for Detoxification of Mycotoxins in Feeds and Food Matrices," Recent Patents on Food, Nutrition & Agriculture. 2:96-104.
Krawan (2003) "Influence of Carboxypeptidases on Cocoa Specific Aroma Precursors and Methylpyrazines in Under-Fermented Cocoa Beans," PhD thesis, Universiti Putra Malaysia.
Ishikawa et al. (2001) "Antimicrobial Cuparene-Type Sesquiterpenes, Enokipodins C and D, from a Mycelial Culture of Flammulina velutipes," J. Nat. Prod. 64(7):932-934.
Kamimura (1989) "Removal of Mycotoxins during Food Processing" Tokyo Metropolitan Research Laboratory of Public Health Article. pp. 88-94.
Kang (2003) "Studies on chemical constituents of the mycelia from fermented culture of Flammulina velutipes," Zhongguo Zhong Yao Za Zhi. 28(11):1038-1040.—Abstract Only.
Kang (2005) "Studies on chemical constituents in the mycelia from fermented culture of Flarnmulina velutipes", Zhongguo Zhong Yao Za Zhi. 30(30):193-195.—Abstract Only.
Konno et al. (2002) "Anticancer and Hypoglycemic Effects of Polysaccharides in edible and Medicinal Maitake Mushroom [Grifola frondosa (Dicks.: Fr.) SF Gray]," International Journal of Medicinal Mushrooms, 4(3):10-21.
Kuo et al. (1996) "Cordyceps sinensis as an Immunomodulatory Agent," Am. J. Chin. Med., 24:111-125.
Lakshmi et al. (2003) "Antiperoxidative, anti-inflammatory, and antimutagenic activities of ethanol extract of the mycelium of Ganoderma lucidum occurring in South India", Teratog. Carcinog. Mutagen. 1:85-97.—Abstract Only.

Lee et al. (2003) "Biological activities of the polysaccharides produced from submerged culture of the edible Basidiomycete Grifolafrondosa", Enzyme and Microbial Technology, 32(5):574-581.
Lefeber et al. (2012) "On-farm implementation of a starter culture for improved cocoa bean fermentation and its influence on the flavour of chocolates produced thereof," Food Microbiology. 30:379-392.
Liu et al. (2012) "Improving the Fermentation Production of the Individual Key Triterpene Ganoderic Acid Me by the Medicinal Fungus Ganodenna lucidum in Submerged Culture," Molecules. 17:12575-12586.
McMahon (2014) "How Can I Make Tempeh?" Conjecture Corporation.
MedlinePlus (2014) "Medical Dictionary Datasheet: Autoclave," Merriam-Webster, Inc. Available on the Internet at URL: http://www.merriam-webster.com/medlineplus/autoclave [last accessed Feb. 7, 2014].
MicrobiologyBytes (2009) "Introduction to Mycology", Microbiology Notes Datasheet. Available on the Internet at URL: http://www.microbiologybytes.com/introduction/myc1.html 8 last accessed Feb. 6, 2014].
Mind Media (2014) "Eating mycelium to trip," Shroomery.org. Available on the Internet at URL: https://www.shroomery.org/forums/showflat.php/Number/1197948 [Last Accessed Jul. 28, 2014].
Mind Media (Oct. 12, 2006) "Liquid Culture Basics," Shroomery.org. Available on the Internet at URL: https://www.shroomery.org/9145 [Last Accessed Jun. 12, 2017].
Morris et al. (2003) "Immunomodulating effects of hot-water extract from Pleurotus ostreatus mycelium on cyclophosphamide treated mice," Micologia Aplicada Internacional. 15(1):7-13.—Abstract Only.
Mycotopia (2014) "Eat Mycelium cakes?" Mycotopia Community Software. Available on the Internet at URL: https://mycotopia.net/topic/9526-eat-mycelium-cakes. [Last Accessed Jul. 28, 2014].
Nagai et al. (2006) "Characterization of honey from different floral sources. Its functional properties and effects of honey species on storage of meat," Food Chemistry. 97:256-262.
Namebright "Technique Sheet: Culture Media for Fungi," Available on the Internet at URL: www.centralpamushroomclub.org/sites/default/files/culture.pdf. [Last Accessed Feb. 12, 2015].
Nowrousian et al. (2007) "The novel ER membrane protein PRO41 is essential for sexual development in the filamentous fungus *Sordaria macrospora*," Molecular Microbiology. 64(4):923-937.
Ogundero (1983) "Thermophilic fungi and fermenting cocoa beans in Nigeria," Mycopathologia. 82:159-165.
Paterson (2006) "Ganoderma—a therapeutic fungal biofactory," Phytochemistry. 67:1985-2001.
Schwan (1998) "Cocoa Fermentations Conducted with a Defined Microbial Cocktail Inoculum," Applied and Environmental Microbiology. 64(4):1477-1483.
Schwan (2004) "The Microbiology of Cocoa Fermentation and its Role in Chocolate Quality," Critical Reviews in Food Science and Nutrition. 44:205-221.
Shao et al. (2001) "Determination of nucleosides in natural Cordyceps sinensis and cultured Cordyceps mycelia by capillary electrophoresis," Electrophoresis. 22(1):144-150.
Simple Machines (2014) "Eat Mycelium?" FungiFun. Available on the Internet at URL: http://www.fungifun.org/forum/index.php?topic=913.0 [Last Accessed Jul. 28, 2014].
Sone et al. (1985) "Structures and Antitumor Activities of the Polysaccharides Isolated from Fruiting Body and the Growing Culture of Mycelium of Ganoderma lucidum," Agricultural and Biological Chemistry. 49(9):2641-2653.
Song et al. (2002) "Antioxidant properties of Antrodia camphorata in submerged culture," Journal of Agricultural Food chemistry 50:3322-3327.
Stamets (2003) "Culturing Mushroom Mycelium on Agar Media," Ch. 12 In; Growing Gourmet and Medicinal Mushrooms. pp. 89-92.
Tang et al. (2002) "Fed-batch fermentation of Ganoderma lucidum for hyperproduction of polysaccharide and ganoderic acid," Enzyme Microbial Technol. 31:20-28.

(56) References Cited

OTHER PUBLICATIONS

Taylor (2001) "Measuring Fungal Growth," Chapter 3.8 in; Microorganisms and Biotechnology. 2nd Ed. Thomas Nelson, Ltd. Delta Place, Cheltenham, U. K. (ISBN 0 17 448255 8). Specif. p. 4 (book p. 44).

Tsubouchi et al. (1987) "Effect of roasting on ochratoxin A level in green coffee beans inoculated with Aspergillus ochraceus," Mycopathologia. 97:111-115.

Ulziijargal et al. (2011) "Nutrient Compositions of Culinary-Medicinal Mushroom Fruiting Bodies and Mycelia," Int. J. Med. Mushrooms. 13(4):343-349.

Wasser (2002) "Medicinal mushrooms as a source of antitumor and immunomodulating polysaccharides," Appl. Microbiol. Biotechnol. 60:258-274.

Wikianswers (2014) "Can You Eat Mycelium?" Answers. Available on the Internet at URL: http://www.answers.com/Q/Can you eat mycelium [Last Accessed Jul. 28, 2014].

Willis et al. (2010) "Effect of Dietary Fungus Myceliated Grain on Broiler Performance and Enteric Colonization with Bifidobacteria and *Salmonella*," International Journal of Poultry Science. 9(1):48-52.

Wisegeek (2014) "Eating Mycelium," Conjecture Corporation. Available on the Internet at URL: http://topics.wisegeek.org/topics.htm?eating-mycelium# [Last Accessed Jul. 28, 2014].

Wu et al. (2011) "Ling Zhi-8 mediates p53-dependent growth arrest of lung cancer cells proliferation via the ribosomal protein S7-MDM2-p53 pathway," Carcinogenesis. 32(12):1890-1896.

Yin et al. (2010) "Purification, Characterization and Immuno-Modulating Properties of Polysaccharides Isolated from Flammulina velutipes Mycelium," Am. J. Chin. Med. 38(1):191-204.

Zhang et al. (2004) "Induction of HL-60 apoptosis by ethyl acetate of Cordyceps sinensis fungal mycelium," Life Sciences. 75:2911-2919.

Zhang et al. (2010) "Mycelial growth and polysaccharide content of Polyporus umbellatus," Journal of Medicinal Plants Research. 4(18):1847-1852.

Zhong et al. (2004) "Submerged Cultivation of Medicinal Mushrooms for Production of Valuable Bioactive Metabolites," Adv. Biochem. Eng. Biotechnol. 87:25-59.

Zhou et al. (2009) "Cordyceps fungi: natural products, pharmacological functions and developmental products," Journal of Pharmacy and Pharmacology. 61:279-291.

Zoklet "Eating Mycelium?" (2014) Jelsoft Enterprises Ltd. Available on the Internet at URL: http://www.zoklet.net/pbs/showthread.php?t=141966 [Last Accessed Jul. 28, 2014].

International Preliminary Report on Patentability corresponding to International Patent Application No. PCT/US2014/029989, dated Sep. 15, 2015.

International Preliminary Report on Patentability corresponding to International Patent Application No. PCT/US2014/029998, dated Sep. 15, 2015.

International Search Report and the Written Opinion corresponding to International Patent Application No. PCT/US14/29989, dated Aug. 12, 2014.

International Search Report and the Written Opinion corresponding to International Patent Application No. PCT/US14/29998, dated Sep. 11, 2014.

International Search Report and the Written Opinion corresponding to International Patent Application No. PCT/US2015/047036 dated Jan. 29, 2016.

International Search Report and the Written Opinion corresponding to International Patent Application No. PCT/US2016/019929 dated May 19, 2016.

Office Action corresponding to Japanese Patent Application No. 2016503300, dated Sep. 21, 2016—with English translation.

Office Action corresponding to Japanese Patent Application No. 2016503304, dated Sep. 30, 2016—with English translation.

Office Action corresponding to U.S. Appl. No. 13/844,685, dated Feb. 19, 2014.

Search Report corresponding to European Patent Application No. 14763975.1, dated Sep. 14, 2016.

Search Report corresponding to European Patent Application No. 14765389.3, dated Nov. 17, 2016.

Jonathan et al. (2011) "Evaluation of Ten Wild Nigerian Mushrooms for Amylase and Cellulase Activities," Mycobiol. 39(2):103-108.

Thammawat et al. (2008) "Isolation, Preliminary Enzyme Characterization and Optimization of Culture Parameters or Production of Naringinase Isolated from Aspergillus niger Bcc 25166," Kasetsart J. (Nat. Sci.) 42:61-72.

International Search Report with Written Opinion corresponding to International Patent Application No. PCT/US2017/027731, dated Jul. 19, 2017.

Tietel, Zipora & Masaphy, Segula (2018) True morels (Morchella)—nutritional and phytochemical composition, health benefits and flavor: A review, Critical Reviews in Food Science and Nutrition, 58:11, 1888-1901.

Machida, Masayuki et al. (2008) Genomics of Aspergillus oryzae: Learning from the History of Koji Mold and Exploration of Its Future, DNA Research 15, 173-183.

* cited by examiner

METHODS FOR LOWERING GLUTEN CONTENT USING FUNGAL CULTURES

CROSS REFERENCE TO RELATED APPLICATIONS

This application a U.S. National Phase application under 35 USC § 371 of International Patent Application No. PCT/US2016/019929, filed Feb. 26, 2016, which designates the United States and claims priority to U.S. Provisional Application No. 62/121,483 filed Feb. 26, 2015, each of which are incorporated herein by reference in their entireties.

TECHNICAL FIELD

The present invention utilizes mycological methods to hydrolyze prolamin, glutelin and prolamin/glutelin complexes in grain. The use of mycotechnological methods for the production of human and animal grade material is discussed as is the specific sequence of actions needed taken in order to successfully accomplish the manifestation of extensively hydrolyzed prolamin and glutelin in grain.

BACKGROUND

Celiac disease is an autoimmune disorder that inhibits the physiology and degrades the tissue of the small intestine due to the presence of serotypical HLA-DQ2 receptors that recognize deaminated gluten/glutaminase complexes as antigenic. A gluten-free diet is the only medically accepted treatment. The disease affects an estimated 1% of adults worldwide and appears to be on the rise epidemiologically but because of the rare occurrence of symptoms it is believed that only 5-10% of cases are diagnosed. Tolerable gluten doses varies among people with celiac disease. Although there is no evidence to suggest a single definitive threshold a daily gluten intake of less than 10 mg is unlikely to cause significant histological issues. A gluten-free diet is generally recommended to those with celiac disease.

Regulation of the gluten-free label varies by country. Most countries derive key provisions of their gluten-free labeling regulations from the Codex Alimentarius International Food Standards for labeling, which has a standard relating to the labeling of products as gluten-free. Gluten-free is defined as 20 ppm (20 mg/kg) or less. It classification of gluten-free food includes food that has become gluten-free through "special processing".

The inventors have developed methods for myceliating agricultural substrates, see, e.g., PCT/US14/29989, filed Mar. 15, 2014, PCT/US14/29998, filed Mar. 15, 2014, U.S. 61/953,821, filed Mar. 15, 2014, U.S. 61/953,823, filed Mar. 15, 2014, U.S. 62/042,071, filed Aug. 26, 2014, all of which are incorporated by reference herein in their entireties.

A need remains in the art for gluten-containing products with reduced gluten levels and for methods of obtaining such products. There are no reports of higher order filamentous fungi hydrolyzing gluten as described herein and in view of art it is apparent that efficient digestion of gluten is difficult.

SUMMARY OF THE INVENTION

The present invention provides a method for the preparation of a gluten-containing grain having lowered levels of gluten. The method includes providing a prepared gluten-containing grain. The prepared gluten-containing grain may then be inoculated with a prepared fungal component and is incubated. In one embodiment the prepared fungal component myceliates the prepared gluten-containing grain during incubation and hydrolyzes gluten in the gluten-containing grain. The present invention also includes a gluten-containing grain having lowered levels of gluten, which has been prepared by the methods of the invention.

In one embodiment the method further includes drying and/or pasteurizing the grain having lowered levels of gluten after performing the steps of the method. The method also may further comprise hydrating the gluten-containing grain with water prior to or following the sterilization step (with sterile water if hydrated post-sterilization), optionally with about 50% v/m water to grain and preferably with RO water. In one embodiment the moisture content of the grain can be calibrated to any moisture content during myceliation if the mass and initial moisture content of the grain are known and the final moisture content and inoculant volume have been decided upon according to the following equation:

Let M=substrate mass (kg)
$MC_i$=initial moisture content (% in decimal)
$MC_f$=final moisture content (% in decimal)
I=inoculation volume (L)
H=hydration volume (L)

$$H = \frac{M(MC_f - MC_i) + I(MC_f - 1)}{(1 - MC_f)}$$

Many variations of this equation are possible depending on the formulator's perspective. It may be preferable to consider the bulk density of the substrate in order to control for headspace volume during myceliation. Such an equation using the variables from above and others listed below:

Let $V_c$=volume of container (L)
$\%_s$=percent of container filled with substrate (% as decimal)
BD=bulk density of pre-hydrated substrate (kg/L)

$$M = \frac{BD(V_c\%_s - 2I)}{1 + \frac{BD(MC_f - MC_i)}{(1 - MC_f)}}$$

$$H = \frac{BD(V_c\%_s - 2I)(MC_f - MC_i)}{\left(1 + \frac{BD(MC_f - MC_i)}{(1 - MC_f)}\right)(1 - MC_f)} - I$$

Other embodiments of these equations are possible and are in large part used according to the perspective of the mycologist preparing the substrate. It is possible to develop such equations considering the percentage of inoculant volume to substrate mass, inoculant volume to substrate volume plus hydration volume etc., in order to precisely determine substrate moisture content during the myceliation step and control for conditions between cultures.

In some embodiments, greater than or equal to about 90%, 95%, 99%, 99.5%, or 99.99% of the gluten is removed by the methods of the invention. In some embodiments the gluten content of the substrate is brought to less than 20 mg/kg. In some embodiments the gluten content is brought to less than 10 mg/kg as, without being bound by theory, mycelium will eventually 100% consume bioavailable substrate, leading one to believe that material with 0 mg/kg gluten is possible due to the methods of the present invention.

In one embodiment, the prepared fungal component is a submerged fungal liquid tissue culture and the incubation step comprises culturing the submerged fungal liquid tissue culture with the prepared gluten-containing grain for optionally between two and twenty-two days. In one embodiment, the submerged fungal liquid tissue culture is grown in a media comprising organic food powders and in another embodiment in human food-grade media and in another embodiment in animal-feed grade media.

Gluten, as defined herein, is generally used to refer to a prolamin/glutelin complex aggregate. The term 'gluten' henceforth refers to any prolamin, glutelin or prolamin/glutelin aggregate including the specific gliadin/glutenin aggregate known as gluten. Prolamin and glutelin are generally understood to be precursors of gluten in food products. Gluten is understood to be an aggregate of these two precursor proteins, formed and held together by disulfide bridges upon soaking and kneading. Gluten thus falls under the compound designation 'prolamin/glutelin aggregate'. Prolamin includes gliadin from wheat, hordein from barley, secalin from rye, avenin from oats, and zein from corn. Glutelin in wheat flour includes glutenin. Gluten can be measured by at least one of prolamin, glutenin, or prolamin/glutelin aggregate analysis, and in some embodiments, measured with ELISAs.

The prepared fungal component may include a species/strain from one or more of the following: *Hericium erinaceus, Pleurotus ostreatus, Pleurotus eryngii, Pleurotus citrinopileatus, Pleurotus djamor, Trametes versicolor, Lentinula edodes, Armillariella mellea, Tricholoma matsutake, Flammulina velutipes, Volvariella volvacea, Agaricus campestris, Agaricus blazei, Grifola frondosa, Pholiota nameko, Agrocybe cylindracea, Boletus ornatipes, Ganoderma lucidum, Ganoderma applanatum, Hypsizygus marmoreus, Morchella angusticeps, Morchella esculenta, Morchella hortensis, Phellinus linteus, Auricularia auricula, Tremella fuciformis, Inonotus obliquus, Fomes fomentarius, Laetiporus sulfureus, Bridgeoporus nobillismus, Stropharia rugossannulata*, edible *Clitocybe* spp., *Cordyceps sinensis, Cordyceps militaris, Polyporus umbellatus*, and combinations thereof. In some embodiments the strain is from *Morchella esculenta*. In another embodiment the strain is from *Tricholoma matsutake*. In another embodiment the microorganism is any genetically modified organism mutated to secrete the proteolytic 'glutenase' or class of enzymes thereof that hydrolyze gluten according to the means of the present invention. Biochemical methods using this enzyme/enzymes may be possible though the mycological ability to penetrate crystalline solids may be an enabling aspect of the present invention that could render biochemical treatments of grain inefficacious.

The methods of the present invention can also lead to the increase of crude nitrogen in grain having reduced gluten compared to the starting material. Such increases may be at least 5%, at least 10%, at least 15%, at least 20% and at least and or more than 50% increase in crude nitrogen.

The present invention also includes a gluten-containing grain having reduced levels of gluten prepared by the methods of the invention.

DETAILED DESCRIPTION OF THE INVENTION

In one embodiment the present invention provides a method for the preparation of a gluten-containing grain having reduced levels of gluten. The method includes providing a prepared gluten-containing grain. The prepared gluten-containing grain is then inoculated with a prepared fungal component and allowed to incubate. In one embodiment, the prepared fungal component myceliates the gluten-containing grain during incubation, hydrolyzing gluten in the gluten-containing grain with a protease or proteases that will, as previously mentioned, likely be coined glutenase upon isolation and characterization of the protein(s).

In one embodiment prepared gluten-containing grain is provided which includes the step of providing a gluten-containing grain or combinations thereof. Gluten-containing grain refers to *Triticum* spp., *Hordeum* spp., *Secale* spp., *Zea* spp., *Sorghum* spp., and *Avena* spp. There are six general wheat classifications: 1) hard red winter, 2) hard red spring, 3) soft red winter, 4) durum (hard), 5) Hard white and 6) soft white wheat though there are numerous species amongst these six. The hard wheats have the highest gluten content and are used for making bread, rolls, and all-purpose flour. The soft wheats are used for making flat bread, cakes, pastries, crackers, muffins, and biscuits.

For wheat, the gluten-containing grain can be used after threshing as wheat heads or wheat berries. For barley the barley heads may be used after threshing. Corn may be used while still attached to the ear, as it is taken off the ear or as cracked corn.

In some embodiments, the gluten-containing grain is not dried prior to being used in the processes of the instant invention. In other embodiments the grain is dried.

In some embodiments, the dried gluten-containing grain is prepared by a step of hydrating the gluten-containing grain. Hydration is particularly useful where the gluten-containing grain has been dried. Hydration ensures that the gluten-containing grain has optimal moisture content for the culturing process. Hydration may be accomplished by a number of methods known in the art. In one embodiment, the water is added to the grain directly before sterilization.

The hydration may be accomplished by an aqueous medium. The aqueous medium includes water and, optionally, additional excipients. Water may be distilled, filtered, ozonated or mineralized, or can be tap water. Other excipients can be added to the water, such as buffers to maintain a certain pH, sodium chloride, citric acid, ascorbic acid etc. The pH may be neutral or adjusted. The temperature of the aqueous medium may be room temperature, or elevated in temperature to accelerate the hydration process.

Hydration may be accomplished by allowing the gluten-containing grain to soak in the aqueous medium for any appropriate length of time, ranging from a few seconds or less to overnight. The hydration step may be less than a second, at least five seconds, at least ten seconds, at least thirty seconds, at least a minute, at least five minutes, at least ten minutes, at least twenty minutes, at least thirty minutes, at least forty minutes, at least fifty minutes, at least an hour, at least an hour and a half, or at least two hours. The time for the hydration step should be selected in view of the fact that the gluten-containing grain is not sterile and soaking for too long of a time may encourage contamination. Slightly longer soaking times (upwards of two hours), will shorten sterilization cycles, as most spores will have sprouted and will require less energy to kill. It is of primary importance that the water and mass of grain are not separated at any time post-hydration.

The gluten-containing grain may be hydrated at any temperature that allows for effective hydration; in one embodiment the temperature of the aqueous component is room temperature. Hydration temperature should be selected in view of the fact that at high temperatures desirable flavor components may be altered.

Hydration may be performed under normal atmospheric pressure or may be performed under increased pressures to accelerate the hydration process, such as between 1 atmospheric pressure and 2 atmospheric pressures, for example, at 1.5 atmospheres.

In one embodiment, about 50% v/m of water to the gluten-containing grain is added; however this proportion may be adjusted to optimize the myceliation processes of the instant invention according to the equations discussed in the summary of the invention.

The methods of the present invention further comprise a method of heat treatment such as pasteurizing and/or sterilizing the gluten-containing grain. In one embodiment, the gluten-containing grain is sterilized to provide prepared gluten-containing grain. This step may be accomplished by any method known in the art. For example, this step may performed under atmospheric pressure or under increased pressure. This step may also be referred to as "pre-processing". This step is performed to decrease the viability of undesirable microbial contaminate from growing on the gluten-containing grain.

Methods for pasteurization and/or sterilization may be carried out as known in the art. As an example of pasteurization, gluten-containing grain may be subjected to dry heat treatment at atmospheric pressure at 145-190° F. for 30-90 minutes, and alternatively at 140-212° F. for 20-100 minutes.

Sterilization of the gluten-containing grain may be performed by methods known in the art. Gluten-containing grain may for example be sterilized by heating under pressure at 15 lb/in$^2$ gauge at 121-122° C. for 20-180 minutes, such as 90 minutes. Examples of suitable pasteurization conditions are 108-109° C. at 5 lb/in$^2$, 115-116° C. at 10 lb/in$^2$, for 20-90 minutes. In another embodiment, the steam is superheated to 250-255° F. The pressures may vary from 5-25 lb/in$^2$ and are mostly dependent on altitude. Gluten-containing grain may be sterilized in a container. The container may optionally be the same container as the container used for hydration step. The container may be optionally a sealed food-grade fermenter and the gluten-containing grain may be sterilized by the application of heat to the exterior (the fermentor's jacket) and interior of the container while being agitated. In one embodiment, the heat is provided by applying steam to the exterior of the container for a sufficient period of time to allow for sterilization of the contents.

Suitable containers include containers known in the art for mushroom cultivation. The containers optionally have a section for exchanging air or gases but do not allow passage of any other component. Such sections are known in the art and include filter strips. In one embodiment, the container is a drum, for example, a properly outfitted 55 gallon drum. In another embodiment the container is a polypropylene bag with breather patch.

In some embodiments, the containers of the instant invention can be glass, stainless steel or temperature-resistant high density polyethylene or polypropylene bags. Fermenters and bioreactors can also be used as containers of the instant invention. In some embodiments, the containers have a means for gas exchange that precludes passage of contaminants, such as filter zones or valves.

In one embodiment the container is a bag, for example an autoclavable, polypropylene bag with filter strips/patch, an autoclavable, high density polyethylene bag with filter zones or a gamma-irradiated polyethylene bag with filter zones.

The size of the bags to be used can be chosen according to the volume of gluten-containing grain to be treated by the methods of the present invention.

Fungal Component

The fungal component to use with the present invention can be a strain from the Basidiomycetes or Ascomycetes, including the species: *Hericium erinaceus, Pleurotus ostreatus, Pleurotus eryngii, Pleurotus citrinopileatus, Pleurotus djamor, Trametes versicolor, Lentinula edodes, Armillariella mellea, Boletus edulis, Tricholoma matsutake, Flammulina velutipes, Volvariella volvacea, Agaricus campestris, Agaricus blazei, Grifola frondosa, Pholiota nameko, Agrocybe cylindracea, Boletus ornatipes, Ganoderma lucidum, Ganoderma applanatum, Hypsizygus marmoreus, Morchella angusticeps, Morchella esculenta, Morchella hortensis, Phellinus linteus, Auricularia auricula, Tremella fuciformis, Inonotus obliquus, Fomes fomentarius, Laetiporus sulfureus, Bridgeoporus nobillismus, Stropharia rugossannulata,* edible *Clitocybe* spp., *Cordyceps sinensis, Cordyceps militaris* and *Polyporus umbellatus*. Combinations of the above fungi may also be used.

Fungal components useful in the present invention may be prepared by methods as described herein. For example, in one embodiment a pure strain of fungus is used. In some embodiments the pure strain of fungus is effectively able to grow on and/or myceliate the prepared gluten-containing grain to prepare the reduced gluten grain. Any strain of fungus identified herein which is capable of effectively growing on and/or myceliating prepared gluten-containing grain can be used for the methods of the present invention given they have the ability to hydrolyze gluten. Two strains are discussed herein that have such ability.

The methods of the invention have as an optional additional step, a method of selecting a fungal component having an enhanced and/or increased ability to grow on, metabolize or otherwise utilize and/or modify gluten and/or remove gluten from the gluten-containing grain. This method comprises screening a number of strains of a desired fungal species to select for a suitable fungal component which exhibits the enhanced and/or increased ability to grow on, metabolize, scavenge, or otherwise utilize and/or modify gluten-containing grain and/or hydrolyze gluten, and using this selected strain(s) in the methods of the invention.

In one embodiment a pure strain of any commercially available *M. esculenta* is used as the fungal component. While all strains of *M. esculenta* are effective for the present invention it was surprisingly found that some selected strains have the enhanced abilities useful for the present invention as described herein. One such strain useful for the fungal component of the present invention is *M. esculenta* WC833 commercially available from Pennsylvania State University (The Pennsylvania State University Mushroom Culture Collection, available from the College of Agriculture Sciences, Department of Plant Pathology and Environmental Microbiology, 117 Buckhout Laboratory, The Pennsylvania State University, University Park, Pa., USA 16802), which demonstrated a heightened ability to grow on hard red winter wheat.

Another strain useful for the present invention is a wild-type *T. matsutake* collected from the Rocky Mountains in the hills just around Nederland, Colo.

In one embodiment a filtrate of undefined vegetable (of any type but ideally organic) aqueous extract, such as malt, potato, carrot or a combination thereof is used as growth media. Aqueous potato mixture can be prepared by softening 1-300 g of potato mass in boiling or pressurized water, mashing the potatoes and collecting the filtrate through 1-3 filtrations. Optionally, fruit juice with no added sugars can also be added. In one embodiment, the medium comprises 0.1-10% by weight of malt extract, 0.1-10% by weight of glucose, and 20-80% by weight of water.

As a non-limiting example of the media, for example, agar media can be prepared from a media of 15-60 g/L agar with 3-20 g/L organic potato starch powder, 0.3-12 g/L organic carrot powder and 10-200 mL/L organic mango puree in RO filtered water. Any combination of these ingredients may be used. Additional media can include nutritional yeast, brown rice syrup, blackstrap molasses and salts such as diammonium phosphate and ammonium sulfate, all used as is generally done in the art. These solutions are combined and autoclaved. Liquid media is made by the same recipe except agar is omitted.

Once prepared the media can be sterilized by any method known in the art. Once the media has cooled post-sterilization it is poured into Petri plates and fungal cultures are propagated from plate to plate in good and clean technical operation as known in the art. Slants for test tubes, liquid flasks and glycerol stocks may be prepared by this method. Petri plates can be inoculated with floating and submerged liquid tissue culture and with myceliated grain.

In one embodiment, the fungal component for inoculation into gluten-containing grain can be prepared by submerged liquid tissue culture using the liquid media as defined herein and agitated on a shaker table. In one embodiment, the agitation rate is 50-240 RPM, or 85-95 RPM, and incubated for 1-90 days. In one embodiment, the temperature of incubation is 87-89 OF.

In one embodiment, the fungal component is trained and/or adapted and/or maintained in its ability to efficiently grow on, metabolize or otherwise utilize and/or modify gluten.

Therefore, the methods of the invention have as an optional additional step, a method of preparing a trained and/or adapted and/or maintained fungal component comprising a fungal component having an enhanced and/or increased ability to grow on, metabolize or otherwise utilize and/or modify gluten and/or remove gluten from the gluten-containing grain. The methods of the invention further comprise use of any of the trained, adapted and/or maintained fungal component(s) as described herein, in the methods of the instant invention.

In one embodiment, methods for preparing the fungal component to inoculate the prepared gluten-containing grain include scaling up a fungal component as defined herein into a large volume bioreactor culture for the inoculation of numerous bags of prepared gluten-containing grain (20-1,000 bags) or for the inoculation of fermenter(s) with large volumes of inoculant (e.g. 10-500 L of inoculant per fermenter). Such a fungal component which is readied for inoculation of the prepared gluten-containing grain is called a "prepared fungal component".

In one embodiment the prepared fungal component is in solid culture. In another embodiment the prepared fungal component is in liquid culture. In another embodiment the prepared fungal component is a mixture of solid and liquid culture. Liquid culture can be accomplished by any means known in the art and includes use of stationary culture and/or a bioreactor. For example, when using a bioreactor to prepare the fungal component, the bioreactor can be prepared by diluting undefined liquid media up to 1000× with filtered water. The jacket of the bioreactor may be steamed in one embodiment to sterilize the media, or alternatively, the media can be sterilized by way of injecting steam into the vessel. In another embodiment both jacket and chamber are steamed. In another embodiment the fermenter is sterilized empty and filled with filter sterilized water and with a sterilized media concentrate, either sterilized in situ and pumped into the fermenter through a sterile line, filter sterilized or sterilized in small batches and pumped into the fermentor. Pasteurization is possible for any or all of these procedures.

The media to use in preparation of a fungal component for use to inoculate the prepared gluten-containing grain may be any suitable media known in the art so long as it is human grade (or animal-feed grade depending on the intention of the myceliation) or may be made by the methods disclosed herein. The media may further comprise trace elements and organic substances such as water, nucleic acids, nitrogen content, vitamins and minerals. The media may be diluted up to 1000× with filtered water. Dilution can be 1×, about 2×, about 3×, about 4×, about 5×, about 6×, about 7×, about 8×, about 9×, about 10×, about 15×, about 20×, about 25×, about 30×, about 35×, about 40×, about 45×, about 50×, about 55×, about 60×, about 65×, about 70×, about 80×, about 90×, about 100×, about 150×, about 200×, about 250×, about 300×, about 350×, about 400×, about 450×, about 500×, about 550×, about 600×, about 650×, about 700×, about 750×, about 800×, about 850×, about 900×, about 950× or about 1000×. In some embodiments, the dilution is about 5× to about 100×. For example in a 100 L bioreactor media can be diluted about 10×.

In one embodiment, to inoculate the reactor, media may be pumped from another reactor through a sterilized line with an inline pump or by creating positive pressure by sparging air into the reactor with an air compressor system that runs the air through inline 0.2/0.5 µm capsule filters, or equivalent stainless steel cartridge filters, and then through a check valve with a specific cracking pressure, for example, 2-3 psi. Pressure can also be held with a back-pressure regulator. Additionally, pressure can be regulated upstream with a pressure regulator. A slightly pressurized fermenter (1-3 psi) may be opened and have culture poured into it in a clean environment. This procedure is dangerous and should only be executed by one of skill in the art.

Methods to inoculate the bioreactor to prepare the fungal component include inoculating the bioreactor with an excised colonized section of Petri plate and/or a sample of myceliated agriculture using sterile procedure, or by pouring a floating or submerged liquid tissue culture into the bioreactor through the nozzle or through a pump.

The fungal component optionally may be agitated during culturing by methods known in the art. For example, in a bioreactor the agitation may be accomplished by a combination of sparged air and a motorized paddle which allows both a turbulent environment and shear mechanical force. The inventors, without limitation, have found that the combination is superior to running either method individually, as sparged air creates the most turbulence at the top half of the culture, while affecting the bottom less, which can be kept agitated by a motorized paddle, while the paddle does not have to run at such a high RPM as normally used in the art. More sophisticated setups are known and can be enacted to agitate a bioreactor with liquid culture. Solid state fermenter work has many options known in the art, the most ideal being rotating buckets or agars to evenly and gently agitate grain.

Liquid state fermentation agitation and swirling techniques are known in the art and include mechanical shearing using magnetic stir bars, stainless steel impellers, injection of sterile high pressure ambient air, injection at high-pressure of sterile media, and or the use of shaker tables.

The fungal component can be grown until ready for inoculation of the prepared gluten-containing grain as determined by one of skill in the art and is most easily monitored with pH. The procedure generally includes a rise in pH. In some embodiments, the fungal component can be grown for 72 hours prior to use in inoculating the gluten-containing grain. Determination of whether the fungal cultures comprising the fungal component are suitable for inoculation of the prepared gluten-containing grain can be determined by one of skill in the art. For example, in one embodiment the fungal culture, when in liquid media, is suitable for inoculation while in log phase, either early or late. Senescing cultures and cultures in secondary phases with lower amounts of mycelia/mL can be used but are not preferred. The prepared fungal component optionally appears well grown through in the media, with visible mycelia growing through every mL visible by microscope and unassisted vision.

These methods result in a prepared fungal component for inoculation of prepared gluten-containing grain.

The prepared gluten-containing grain is inoculated with the prepared fungal component in a manner so as not to contaminate the culture. The prepared fungal component to be used can be any fungal component as defined in the instant invention. The inoculation of the prepared fungal component onto the prepared gluten-containing grain can be carried out by any method known in the art. This step may be variously referred to as the culturing step, the fermentation step, the incubation step, and/or the myceliation step.

The myceliation may take place in a container as described herein. In one embodiment, the myceliation takes place in a 55 gallon drum as described herein. In this embodiment, the 55 gallon drums has a lid containing two ports, and one port can be used as an inoculation port, while the other can be used to sparge in filtered air to the bottom of the culture, and simultaneously serve as a vent. In some embodiments, the inoculation port is a quick disconnect socket, which is attached to a quick disconnect plug at the end of a harvesting line during inoculation. Optionally, prepared gluten-containing grain in a plurality of drums can be myceliated in one cycle via a sterilized manifold connected to bioreactor harvesting line, with the included infrastructure to target any drum in singular or all together at once. In one embodiment a system for volumetrically consistent dispensing of inoculant per culture is used.

In one embodiment, the culture may be pneumatically injected into a container comprising the prepared gluten-containing grain. Moisture may optionally be injected into bags to optimize mycelial growth. In another embodiment the prepared gluten-containing grain is inoculated by pouring the culture into the container holding the sterilized gluten-containing grain either manually or through a valve built into the fermenter or bioreactor, the line between the culture containing device and the fermenter/bioreactor being sterilized and cooled, from any variety of liquid tissue culture.

In one embodiment, the prepared gluten-containing grain is cooled to a temperature of between 80-100° F. post-sterilization prior to inoculation with the prepared fungal component. Cooling may be accomplished by refrigeration, by running a cooling agent through the fermenter jacket (if using this embodiment) or naturally at room temperature. The step of myceliating the prepared gluten-containing grain can take place for between 1-90 days, and in one embodiment for about 21 days, and at any temperature that enables myelical activity, for example, at 87-89° F. In another embodiment the culture is incubated at room temperature. In another embodiment it is incubated at 65° F. The culture is optionally incubated at 50-90° F.

Relative humidity of the solid-state myceliation step is between 20% and 90% and in some embodiments about 75%.

The longer the incubation period the greater the production of mycelial dry weight and the greater the gluten hydrolysis in the gluten-containing grain.

Determination of when to harvest the myceliated gluten-containing grain may be determined by a number of methods. Harvesting is generally performed with a timing to optimize the taste profile and/or gluten hydrolysis of the myceliated gluten-containing grain according to the taste profile or gluten level desired. For example, the scent profile of the myceliation culture can be used by the trained person to determine when the culture is ready. Determination of the appearance of the culture may also be done by the trained person. Analytical methods of analysis including high performance liquid chromatography (HPLC), PAGE, ELISA etc. may be employed to carry out measurement of gluten or other biomolecules, in order to determine the optimum composition and cultivation conditions and the appropriate time(s) for harvesting the myceliated grain.

In some embodiments, the step of culturing or myceliation may also cause reduction and/or removal of gluten as described herein. In some embodiments, determination of the extent of the removal of gluten can be by quantitation, e.g., the chemical composition may be measured by assay methods as are known in the art for gluten measurement.

In one embodiment, up to 5% of one or more the proteins comprising gluten is removed; in other embodiments, up to 10%, up to 15%, up to 20%, up to 25%, up to 30%, up to 35%, up to 40%, up to 45%, up to 50%, up to 55%, up to 60%, up to 65%, up to 70%, up to 75%, up to 80%, up to 85%, up to 90%, up to 95%, up to 99%, or up to 99.9% of one or more of gluten is removed in the processes of the instant invention. In one embodiment, gluten is quantitatively removed and is less than about 20 ppm. The invention also relates to myceliated gluten-containing grain having reduced levels of gluten as described herein.

In some embodiments, the culturing or myceliation processes of the instant invention provide a myceliated gluten-containing grain with added flavor and/or health promoting components. For example, the myceliated gluten-containing grain may contain exogenously added anti-tumor and immunomodulatory health promoting components such as (1→3) (1→6) β-glucan from the fungi.

Fungi are metabolically similar to animals but structurally similar to plants in that they possess a rigid cell wall largely comprising long polysaccharides (β-glucan and chitin) joined by somewhat difficult to digest beta (β-) linkages and to a smaller extent more easily digestible alpha (α-) linkages in conjunction with membrane-bound proteins. In contrast, plant cell walls (such as gluten-containing grains) are made of cellulose polysaccharides whose (1→4) β-glycosidic bonds are impossible for humans to digest but are digestible by fungi. Fungi cell walls are primarily composed of (1→3) glycosidic linkages, with (1→6) linked side chains, and therefore they may be broken down by minimal processing using water, heat and mechanical treatment, into smaller, more easily digestible, immunologically-active polysaccharides of variable microparticulate size called and related glycoconjugates. The immune response to β-glucan is dependent upon α- or β-glucan structure, which has primary, secondary, and chiral tertiary structures, explaining the differences in immune response to each fungi's unique α- and/or β-glucan profile. Myceliated gluten-containing grain thus has added health promoting components including the molecules described above. Other health promoting components present in the myceliated gluten-containing grain may be components that have various properties such as immunomodulating, anti-aging, aphrodisiac, anti-tumour, antiviral, anti-bacterial and/or anti-fungal properties and include compounds such as α- and β-glucans, glycoproteins, proteins, ergosterols, sterols, triterpenes, and fatty acids, glucomannan, riboglucan, sterpuric acid, mannitol, ribitol, nucleic acid content, etc. These molecules are reputed to be immune boosting and modulating, specifically modulating from a Th2 to Th1 immune response.

In some embodiments, one fully myceliated, the myceliated gluten-containing grain is optionally dried. Drying can be accomplished by means known in the art for drying gluten-containing grain. For example, myceliated gluten-containing grain may be spread on a dry surface to dry. In one embodiment, the myceliated gluten-containing grain is dried down to an approximately 10-13% moisture content.

Optionally, the dried or undried myceliated gluten-containing grain can be pasteurized or sterilized by methods known in the art, which provides for deactivating the fungus. The myceliated gluten-containing grain may then be used as desired. The grain can then be used as per usual and either milled or not. Because more than one strain of filamentous fungus has been discovered to hydrolyze gluten in the solid-state it is likely that more exist.

EXAMPLES

Example 1

Specific and pure strains of fungi obtained from referenced collections were manipulated in sterile environments in 1-10 gal polyproplyene bags, 1 qt-1 gal glass jars or on 9-15 cm Petri plates using undefined, organic fruit and vegetable-based media with 1.5% agar (w/v), in order to monitor and ensure the general vigor and health of strains.

Mycelial samples were grown in a gentle, ambient sterile airflow for 0.5-4 weeks, then excised from Petri plates and subsequently used for inoculation into liquid-state myceliation employing a similar undefined fruit and vegetable-based media (but with no agar) using ambient air in 1 qt-1 gal glass jars. Some samples were grown in agitated and some were grown in unagitated cultures in ambient air in stainless steel fermenters.

The unagitated liquid state fermentation formed a floating mass of hyphae which exhibited continuous growth at interface of liquid and air. The mycelium of agitated and/or swirling cultures grew very quickly as hyphal spheres which, being hydrated, remained submerged and had the appearance of small diameter gelatinous beads. Hydrated hyphal spheres collapsed upon desiccation, wherein they were used for inoculating petri-plates for strain propagation and quality control.

Sphere diameter in liquid-state myceliation was found to be inversely proportional to agitation intensity and volume. Hyphal shear became more efficient at higher agitation and swirling intensity and once sheared hyphae formed new spheres of smallest possible diameter, growing in size until they sheared again. When employed in continuous liquid-state myceliation there existed a constant ratio of sphere diameters, and therefore a constant supply of spheres and hyphal strands adopting spherical morphologies on the order of microns were produced.

This example thus demonstrated that mycelia sphere diameter was manipulated for more efficient inoculation with inoculation efficiency being inversely proportional to sphere diameter.

Example 2

Stationary liquid cultures (growth period of 0.1-4 weeks) formed a floating mass of hyphae, which were gently blended with a sharp, sterile cutting device prior to being used for inoculation. Gentle blending was achieved by mixing or low homogenization in a commercial blender in short bursts at slow speeds. Aliquots of blended liquid-state culture were used to inoculate substrate.

Example 3

For a large batch liquid-state and solid-state operation pure cultures were grown aerobically and inoculated into large industrial liquid-state and large solid-state commercial processors operated continuously for large-scale myceliation of food products. After cultures of media turned completely white or a representative color thereof for a particular species, and had completely overgrown and commanded the medium and were resistant to gentle mixing, the contents were harvested, removed to plastic bags and refrigerated for quick use at either 4° F. or frozen for long-term storage and subsequent utilization at −20° F.

Example 4

Agar media was prepared with 15-60 g/L agar and 3-22 g/L organic potato starch powder, 0.3-12 g/L organic carrot powder, and 40 mL/L organic mango puree in RO water. The 1.5 L media was then subjected to a 1.5 hour liquid sterilization cycle and cooled in a clean space for 1-1.5 hours and then poured into 120 Petri plates which cooled for 12 hours.

In sterile operation, the Petri plates were inoculated and cultured for 7-14 days. Upon which time they were sterilely propagated into 4 L Erlenmeyer flasks containing 1.5 L of sterilized and cooled media prepared as above but without the mango puree and agar. This culture was shaken at 60 RPM with a 1.5" swing radius at room temperature for 1-14 days. This culture was used to inoculate organic hard red winter wheat which was prepared as described below.

Approximately 0.45 kg samples of organic hard red winter wheat was placed inside 2.2 mm thick polypropylene bags with dimensions of 8"×5"×19" (width×depth×height) outfitted with a 0.2 μm breather patch. RO filtered water was added at 50% v/m. The bags were subsequently folded around the grain such that the grain was never inverted and the bags were loosely wrapped with EPDM bands.

The bags were loaded into an autoclave and subjected to a 1.5 hr liquid sterilization cycle. Once sterilized the bags were cooled in a clean space for 12 hours. Each bag was then inoculated with 170 mL of a submerged liquid tissue culture of *M. esculenta* which had been cultured for 8 days and then sealed with a bag sealer.

The bags myceliated in a clean space for 21 days, upon which time there was resplendent growth of mycelial hyphae throughout the wheat. The bags' content were dried indoors for three days on parchment paper in a laminar air flow. At this point, duplicate samples of myceliated and autoclaved grain were sent to a third-party laboratory to detect the gluten and glutenin fractions of gluten using an ELISA method (Elisa Technologies, Gainesville, Fla., Aller-Tek®

Gluten ELISA test kit). The autoclaved control samples were stored at −20° C. for the duration of the myceliation.

The third-party report concluded an average gluten content of 30 ppm while the control had a level too high to quantitate (the upper limit of quantitation was 80 ppm). The estimated gluten content of the control based on the total protein content and the typical gluten precursor fraction of such wheat is 135,000-160,000 ppm, indicating a greater than 99.99% reduction in gluten content. Once rehydrated, the myceliated gluten-containing grain was essentially aductile and did not knead.

Tasters found that the wheat had a pleasant flavor and *M. esculenta* imbued the grain with a honeysuckle taste.

It was found that there was increased crude nitrogen upon completion of the myceliation. The increased protein content was demonstrated as compared to the identically hydrated and autoclaved non-myceliated grain. This finding was unexpected, because in one embodiment instead of a slightly imperfect mass balance between substrate and mycelial nitrogen, the myceliated gluten-containing grain showed a statistically significant increase in total nitrogen content of the culture by 17%. These strains typically have fruit-bodies with high protein content.

Example 5

Eight 1.023 kg samples of hard red winter wheat with an initial moisture content of 10.3% was ultimately hydrated to 55% with 767 mL of RO water added pre-sterilization and 250 mL inoculant. The mass occupied 25% of a 12 L polypropylene bag with 0.2 μm breather patch. Four bags were inoculated with *M. esculenta* and four with *T. matsutake* grown in a media comprising 20 g/L organic potato starch powder and 8 g/L organic carrot powder and were cultured for 12 days. For each strain two bags were set at room temperature and two at 65° F. Visible myceliation was noticed after 3-5 days for every culture and by day 21 the bags were fully colonized. Samples were sent for gluten ELISAs. The *M. esculenta* cultures yielded a gluten content of 19.67 ppm while the *T. matsutake* cultures were at 50 ppm.

Example 6

The grain is dispensed into a food grade pressure vessel capable of agitation, and is sterilized. This is the most efficient way to sterilize and cool large volumes of grain. The grain is inoculated in situ, with controlled humidity, sterile air supply and temperature. Once myceliation is deemed complete, a process that will take anywhere from 1-22 days if done properly (e.g. the culture is at peak vigor of the log phase, the grain serendipitously provides a desirable carbon/nitrogen ratio, contamination is kept at bay, humidity and temperature are controlled for, etc.), and even shorter with some strains. The grain can then be pasteurized in this pressure vessel by methods known in the art, if so desired, and even dried therein. Both of these steps can be accomplished by other methods known in the art. The grain is considered 'gluten-free' by many of the world's regulatory authorities. Methods known in the art can easily produce a 'gluten-free' flour according to the FDA, and some embodiments of the invention will produce a grain with gluten content less than 20 ppm.

What is claimed is:

1. A method for preparation of a gluten-containing grain having reduced levels of gluten, wherein the gluten-containing grain is wheat berries, the method comprising the steps of:
   a) providing a prepared gluten-containing grain comprising the steps of:
      i. providing a gluten-containing grain;
      ii. sterilizing the gluten-containing grain to provide prepared gluten-containing grain to remove microbial contamination;
   b) providing a prepared fungal component, wherein the prepared fungal component consists of a submerged fungal liquid tissue culture selected from the group consisting of *Morchella esculenta*;
   c) inoculating the prepared sterilized gluten-containing grain, wherein the inoculating step consists of contacting the sterilized prepared gluten-containing grain with the prepared fungal component thereby forming a gluten-containing grain and fungal component mixture; and
   d) incubating the gluten-containing grain and fungal component mixture to hydrolyze gluten, wherein the incubating step comprises culturing between two and twenty-two days to induce myceliation, resulting in the gluten-containing grain having less than 20 ppm gluten, and wherein the gluten-containing grain having lowered levels of gluten has had more than 90% of gluten hydrolyzed compared to the prepared gluten-containing grain.

2. The method of claim 1, wherein the method further comprises drying the gluten-containing grain from step (d).

3. The method of claim 1, wherein the method comprises pasteurizing the gluten-containing grain from step (d).

4. The method of claim 1, wherein the method of step a) further comprises hydrating the gluten-containing grain.

5. The method of claim 1, wherein the culturing step is performed for between seven and fourteen days.

6. The method of claim 1, wherein the submerged fungal liquid tissue culture is grown in a human food-grade media.

7. The method of claim 1, wherein gluten is selected from the group consisting of prolamin, glutelin and an aggregate of prolamin and glutelin.

8. The method of claim 1, wherein gluten content is measured by measuring prolamin, glutenin, or prolamin/glutelin aggregate.

9. The method of claim 1, wherein the prepared fungal component is prepared by a method comprising screening a number of strains of fungi and selecting a strain having an enhanced ability to tolerate, grow on, metabolize or utilize gluten.

10. The method of claim 1, wherein the prepared fungal component is prepared by a method comprising maintaining a strain of fungi on an undefined media comprising organic gluten and an energy source.

11. The method of claim 1, wherein the method consists of steps (a) through (d).

* * * * *